United States Patent

[11] 3,595,379

[72] Inventor David R. Campbell
 4163 South 2200 W., Salt Lake City, Utah 84119
[21] Appl. No. 713,746
[22] Filed Mar. 18, 1968
[45] Patented July 27, 1971
 Continuation-in-part of application Ser. No. 596,003, Nov. 21, 1966, which is a continuation of application Ser. No. 374,778, June 12, 1964, now abandoned.

[54] APPARATUS AND METHOD FOR CONVEYING AND ELEVATING SUBSTANCES
 10 Claims, 4 Drawing Figs.
[52] U.S. Cl. .................................................. 198/198
[51] Int. Cl. .................................................. B65g 15/42
[50] Field of Search ........................................ 198/198, 193, 184, 129; 103/72

[56] References Cited
UNITED STATES PATENTS
2,693,269 11/1954 Bentley ..................... 198/184
3,306,218 2/1967 Reeves ...................... 103/72

Primary Examiner—Gerald M. Forlenza
Assistant Examiner—George F. Abraham
Attorney—Stowell & Stowell ABSTRACT: A conveying arrangement wherein an endless belt has a working run that travels in an inclined chute having a top wall and a substantially parallel bottom wall attached thereto by sidewalls with the bottom wall being discontinuous and interrupted by cutout portions, the belt having a bearing face slidably disposed on the bottom wall and closing off the cutout portions so as to complement the top and sidewalls in achieving a conduit effect in which the working run travels. The belt has a working face provided on its opposite sides with upstanding endless flanges and, intermediate the side flanges, with a pattern of spaced and staggered projecting nubs that extend substantially to the undersurface of the top wall for moving substances through the chute with the belt being driven through the chute at a linear speed greater than the fall back speed of a conveyed substance on the working face of the belt.

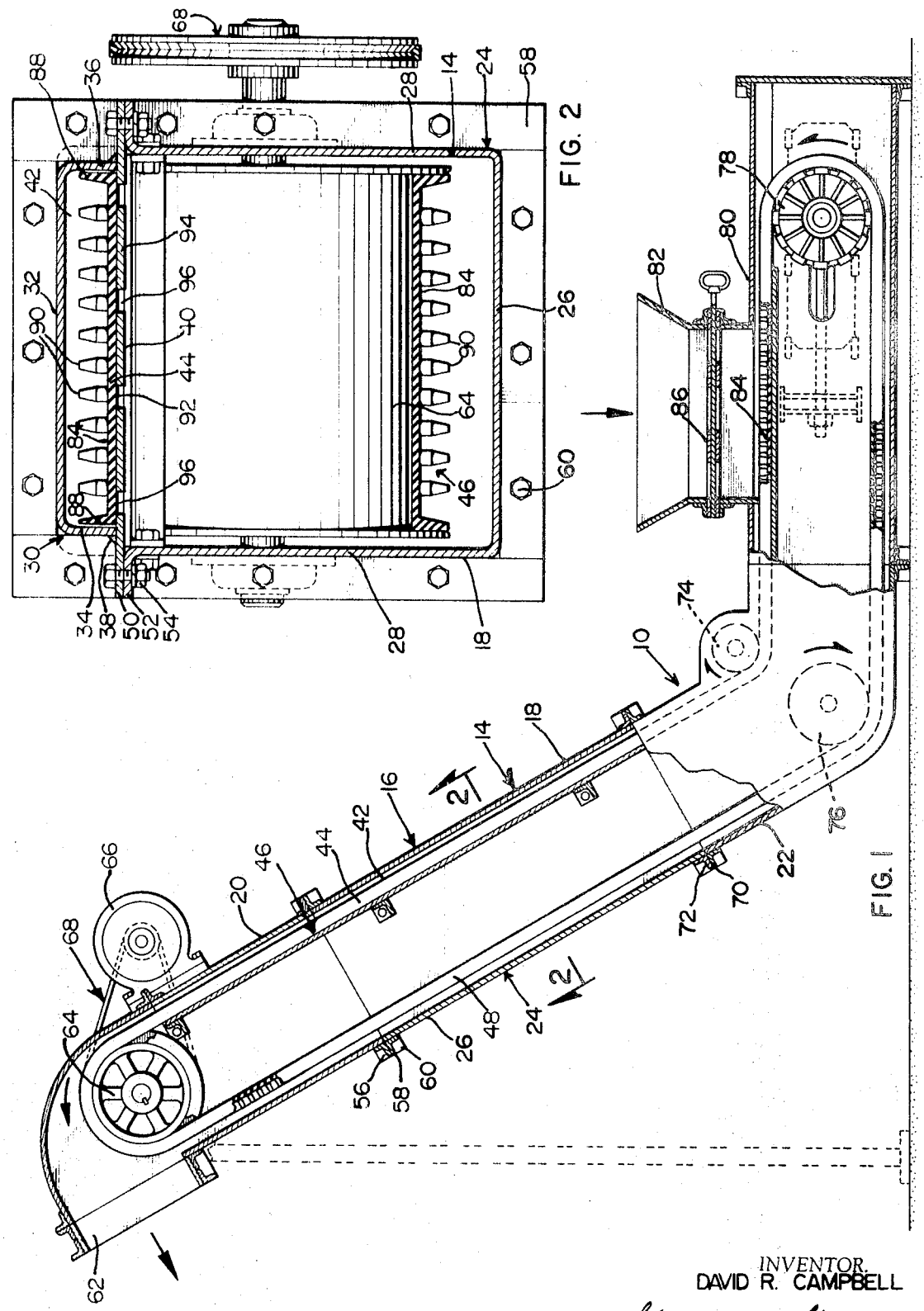

3,595,379

APPARATUS AND METHOD FOR CONVEYING AND ELEVATING SUBSTANCES

CROSS-REFERENCE TO RELATED APPLICATIONS

This application is a continuation-in-part application of my pending application, Ser. No. 596,003, filed Nov. 21, 1966 as a streamlined continuation application of my original application, Ser. No. 374,778, filed June 12, 1964, and now abandoned.

BACKGROUND OF THE INVENTION

1. Field of the Invention

This invention generally appertains to new and novel improvements in methods and apparatus for conveying substances, such as flowable bulk material, liquids or semiliquids, such as slurries or the like materials, and more particularly relates to a new and novel method and apparatus for elevating substances, regardless of the liquid or semiliquid or nonliquid granular nature thereof, for example, at any desired angle of inclination to the horizontal.

2. Description of the Prior Art

In my pending application, Ser. No. 596,003, a conveyor is disclosed which essentially includes an inclined chute composed of a solid top wall and a substantially parallel, solid bottom wall attached thereto by sidewalls, the chute defining a conduit or tube within which a working reach or run of an endless conveyor belt travels. The conveyor belt has a flat bearing face that slidably travels on the top or inner surface of the bottom wall of the chute and has a working face provided with a patterned arrangement of spaced apart, upstanding nubs that project substantially to the undersurface of the top wall. The nubs function on the working face to move material through the conduit, which is delineated by the imperforate and solid top, bottom and sidewalls of the chute. The nubs define a plurality of continuous but devious channels and the belt is moved through the chute at a linear speed greater than the fall back speed of the material on the working face of the belt, as it travels through the chute.

The bottom wall of the chute is formed as a solid panel or sheet partition member which extends transversely between the opposing sidewalls of a hollow rectangular housing and is attached to the inner surfaces of the sidewalls below and parallel with the top wall of the housing. The actual bottom wall of the housing completes the overall enclosure for both the working and the return runs or fights of the belt that is enclosed within the housing. The top wall, sidewalls and partition wall define the chute for the working run of the belt, and in this respect, the partition wall serves as the bottom wall of the chute, with all of the walls being substantially coextensive in length.

SUMMARY OF THE INVENTION

The present invention achieves a conduit effect for the travel of the working run of the belt through the chute by forming the bottom wall with distinctly laid out and placed cutout portions. Thus, the bottom wall of the working run is interrupted and is not of a solid, continuous nature. By moving the imperforate bearing face of the belt over the discontinuous or interrupted bottom wall, the belt travels in a more friction free manner, while, at the same time, the conduit effect of the chute is still realized by virtue of the belt moving over the continuously closing off the cutout portions of the bottom wall. Thus, all of the advantages of the solid wall chute construction of my pending application are retained, while providing improved operation of the conveyor.

In addition, the conveyor belt of the present invention has its working face provided at its opposing sides with continuous, endless flanges that upstand from the working face and cooperate with the nubs in confining the conveyed material on the working face.

Furthermore, the overall construction of the housing and the positioning and mounting of the bottom wall of the conveying flight are extremely simplified in the arrangement of the present invention.

Accordingly, a primary object of the present invention is to provide an area of confinement for the working run of a conveyor belt for use in elevating materials or substances, whereby the belt will operate more efficiently and at less cost.

A further important object of the present invention is to provide an area of confinement for the working run which is partly formed or made up by the belt itself, with the belt functioning to complete the discontinuous bottom wall of the chute that defines the area of confinement.

A still further object of the present invention is to utilize the bearing face of the working run of the conveyor belt as a structural component in the operational construction of the enclosure chute within which the working run travels and to provide the working face with side flanges and nubs, so that there is less, if any in some cases, dependence upon the sidewalls of the chute for prevention of lateral or side fall off of the conveyed material from the working face of the belt as it moves upwardly through the inclined chute.

BRIEF DESCRIPTION OF THE DRAWINGS

FIG. 1 is a longitudinal sectional view of the conveyor apparatus in accordance with the present invention;

FIG. 2 is a transverse, cross-sectional view, taken substantially on line 2-2 of FIG. 1;

DESCRIPTION OF THE PREFERRED EMBODIMENTS

Figure 3:
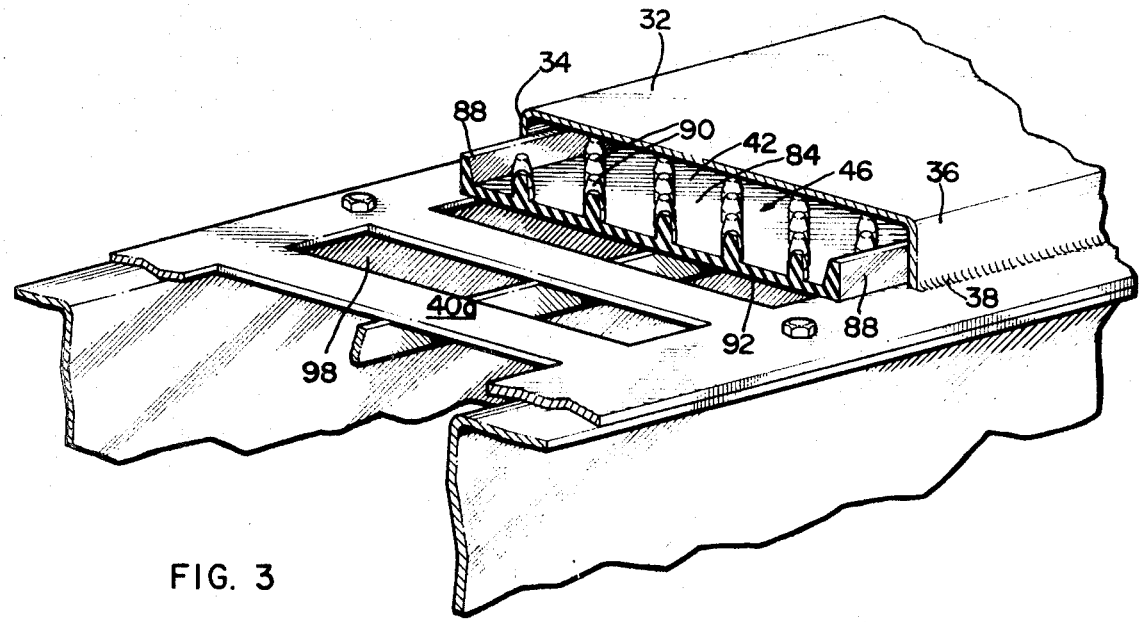
FIG. 3 is a fragmentary, detailed perspective view of another embodiment of the invention.

Referring now more particularly to the accompanying drawings and initially to FIGS. 1 and 2, the numeral 10 generally designates the conveying apparatus of the present invention, which includes a horizontal portion 12 and a vertical portion 14. The vertical portion 14 may be disposed at any desired angle of inclination to the horizontal, as disclosed in my copending application, Ser. No. 596,003.

The vertically extending or upwardly inclined portion 14 includes an elongated hollow rectangular housing 16 which is formed from end to end connected sections, including a lower section 18 and an upper section 20. The lower section is secured to the upwardly inclined end 22 of the horizontal portion 12.

Each of the sections 18 and 20 is similar in construction. Thus, in the case of the section 18, as shown more clearly in FIG. 2, it is composed of a deep U-shaped bottom member 24 which defines the bottom 26 and opposing sides 28 of the housing section 18. A rather shallow U-shaped top member 30 is provided to complete the construction of the housing section with the top member having a top wall 32 and opposing sidewalls 34 and 36. The sidewalls 34 and 36 are secured, as by welding 38, to a partition plate or member 40 which defines a bottom wall for a purpose to be described.

The top wall 32, opposing sidewalls 34 and 36 and the bottom wall 40 defines a chute or tube 42 within which the upper reach or working run 44 of an endless conveyor belt 46 travels. The lower reach or return run 48 of the belt moves along the inside of the bottom 26 of the bottom member 24 for the housing section 18.

The bottom wall 40 has flat marginal side edge portions 50 that protrude laterally beyond the sidewalls 34 and 36 of the top member 30 and overlie laterally outstanding mounting flanges 52 formed on the upper edges of the sides 28 of the bottom member 24. The edge portions 50 and flanges 52 are secured together by bolt assemblies 54 whereby the top and bottom members 30 and 24 of the housing section 18 are joined together.

The upper section 20 is of similar cross-sectional construction and has an inner or lower outwardly flanged end 56 which mates with an outwardly flanged upper end 58 on the lower section 18, with the flanged ends being bolted together in facial engagement by bolt assemblies 60 so that the sections 18 and 20 are attached in end to end relationship to form the sectional housing 16 for the upwardly inclined portion 14.

The upper section 20 terminates in a downturned open discharge spout 62, from which the material carried up through the chute 42 by the working run 44 of the belt 46 is discharged. The chute constitutes a confined area within which the working run travels in conveying material upwardly in the upwardly inclined portion 14.

A drive roller 64 is rotatably journaled in the upper section, adjacent the outlet of the discharge spout 62, and the endless belt 46 is entrained over the roller. The roller is driven by a prime mover 66 through a belt and pulley drive transmission arrangement 68, which drives the roller so that the belt travels at a high rate of speed, as will be described.

The upwardly inclined end 22 of the horizontal portion 12 terminates in an outwardly extending flange 70 to which the flanged lower end 72 of the lower section is bolted. The horizontal portion 12 is of a similar cross-sectional makeup, as the sections 18 and 20 that compose the vertical portion 14. At the juncture of the inclined end 22 and the main extent of the horizontal portion 12, idler rollers 74 and 76 for the upper and lower reaches or working and return runs 44 and 48, respectively, are operatively positioned and travel in the direction of the associated arrows.

The belt is entrained over a roller 78 which is mounted for belt tightening adjustment movement in the outer end section of the horizontal portion 12, as shown in FIG. 1. The roller 78 complements the drive roller 64 in the driven passage of the belt 46 through the horizontal and vertical portions 12 and 14.

The top wall 80 of the horizontal portion 12 is provided with a charging hopper 82 for depositing material onto the working face 84 of the belt, as it passes beneath the outlet of the hopper. A valve plate arrangement 86 is operatively mounted in the hopper to control the gravitational flow of material from the hopper onto the working face of the belt.

As shown more particularly in FIG. 2, the working face 84 of the belt is provided on its side edges with endless upstanding integral flanges 88 that have outer faces disposed in parallel confronting relation with the inner surfaces of the sidewalls 34 and 36 of the chute 42. The flanges 88 are slightly spaced from the inner surfaces so that there is no frictional contact therebetween. The flanges function to prevent side fall off or lateral flow of material from the working face, as the working run travels through the housing portions, especially the vertical portion 14.

The working face is also formed with spaced apart, upwardly projecting nubs 90 that are formed of the same rubberlike material as the belt and its associated side flanges 88. The nubs 90 are arranged in mismatched rows across the width of the working face so that they are longitudinally staggered to define continuous but devious channels for the conveyance of material deposited on the working face, irrespective of the nature of the material. In this respect, the belt is driven by the prime mover 66 at a linear speed greater than the fall back speed of the material on the working face 84 of the belt 46, as the working run 44 travels upwardly through the inclined chute 42.

The working run 44 of the belt has a flat bearing face 92 that slidably travels on the upper surface of the bottom wall 40 of the chute 42. As shown in FIG. 2, the bottom wall is composed of a series of laterally spaced apart, parallel strips 94 which have coplanar upper surfaces on which the bearing face 92 slides so as to close off the slots or longitudinally extending openings 96 between the strips. The belt is imperforate so that its underside or bearing face 92 fully closes off the slots. The width of the belt, as can be seen from FIG. 2, is such that it extends practically from one sidewall 34 to the other sidewall 36. Thus, the belt complements the top wall 32 and the sidewalls 34 and 36 in achieving a conduit effect in which the working run 48 travels, with the belt forming part of the confined area in which the working run travels during its material conveying movement through the upwardly inclined vertical portion 14.

As shown in FIG. 3, the bottom wall 40a is formed with longitudinally spaced, transverse openings or slots 98 which constitute the opening means whereby the bottom wall is broken up or interrupted so as not to be in a continuous solid piece. The belt 46 and other structural details are the same as shown in FIGS. 1 and 2.

Figure 4:
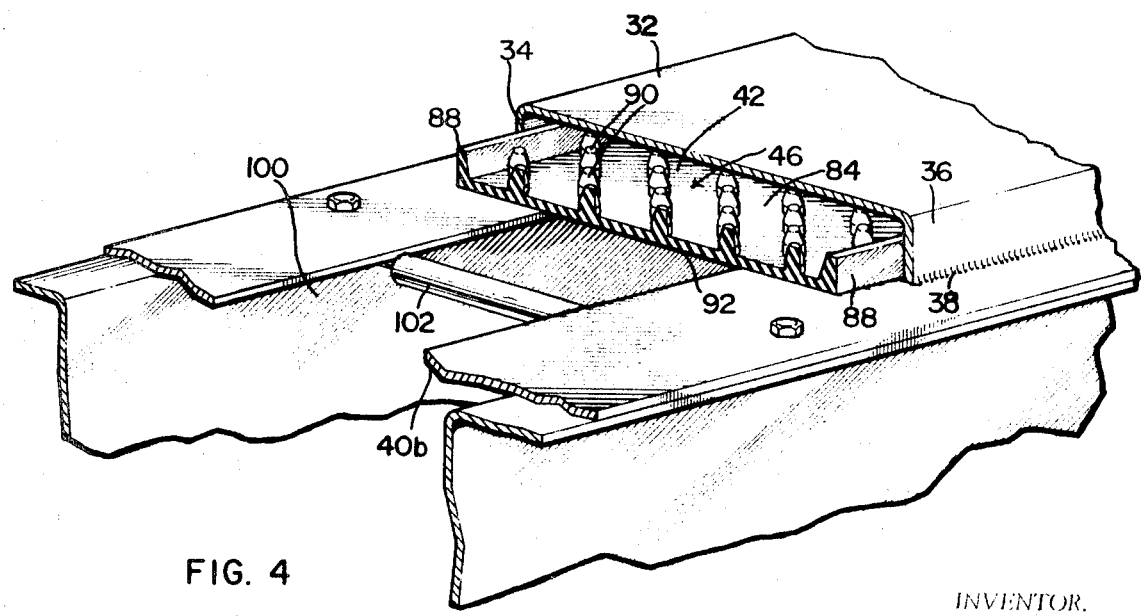
FIG. 4 is a fragmentary, detailed perspective view of a still further form of the invention.

Another interrupted or discontinuous bottom wall arrangement is shown in FIG. 4, wherein the belt 46 and other structural details are the same, as shown in FIGS. 1 and 2, except that the bottom wall 40b is formed with a longitudinally extending, centrally disposed laterally enlarged slot or opening 100. In this arrangement, rollers 102, as shown, can be mounted across the slot 100 at longitudinally spaced points, with the upper belt contacting surfaces of the rollers disposed coplanar with the upper surfaces of the longitudinally interrupted bottom wall 40b so that the bearing face 92 of the belt passes more freely over the bottom wall 40b.

Thus, it can be seen that with any of the forms of discontinuous, broken-up or transversely or longitudinally interrupted forms of the bottom wall constructions for the chute 42, the belt 46 will close off the cutout portions in the bottom wall and will complement the top wall and sidewalls of the chute 42 in forming an effective conduit and confining area for the travel of the working run 44 of the belt 46 and the efficient functioning of the material conveying working face 84 of the belt.

While the preferred form and apparatus for conveying and elevating substances, regardless of their material nature and composition, has been disclosed herein by way of the Abstract, Summary and Description of the Preferred Embodiment, and drawings attendant therewith, it is to be understood that many changes, both constructional and environmental, will occur to those in the art.

What I claim is:

1. A conveyor comprising a chute having a closed top wall and a substantially parallel bottom wall attached thereto by solid sidewalls, said bottom wall being formed with cutout portions so that it is not continuously solid, a conveyor belt having a working run traveling in the chute, said belt having an imperforate bearing face slidably moving on the upper surface of the bottom wall and of a width extending between the sidewalls and thereby closing off the cutout portions so that the belt complements the top and sidewalls in achieving a conduit effect in which the working run travels, and said belt having a working face provided with spaced-apart upwardly projecting nubs extending substantially to the undersurface of the top wall for moving material in the confined area defined by the bottom wall and associated traveling belt thereon, the top wall and the sidewalls.

2. A conveyor comprising an inclined chute having a top wall and opposing substantially parallel sidewalls and a discontinuous bottom wall attached to the sidewalls and disposed thereby in substantial parallelism with the top wall, a conveyor belt having a working run traveling in the chute, said belt having a bearing face slidably moving on the upper surface of the bottom wall substantially completely between the sidewalls and closing off the openings therein so that the belt complements the top and sidewalls in achieving a confined conduit area in which the working run travels, and said belt having a working face provided with spaced-apart upwardly projecting nubs extending substantially to the undersurface of the top wall for moving material in the confined area.

3. The conveyor of claim 2 wherein said working face is formed at opposite sides with upstanding endless flanges.

4. The conveyor of claim 3 wherein said flanges are disposed substantially parallel with and are spaced slightly inwardly from the inner surfaces of the sidewalls of the chute.

5. The conveyor of claim 2 wherein said conveyor belt is endless and has a return run and the belt is entrained over rollers, and drive means connected to one of the rollers for moving the working run at a high rate of speed.

6. The conveyor of claim 2 wherein said bottom wall is formed with longitudinally spaced, transverse cutout portions.

7. The conveyor of claim 2 wherein said bottom wall is formed with laterally spaced, longitudinally extending slotted areas.

8. The conveyor of claim 2 wherein said bottom wall is formed with a longitudinally extending, centrally disposed slot.

9. They conveyor of claim 8 wherein rollers are transversely disposed across the slot with the upper surfaces of the rollers being coplanar with the upper surface of the bottom wall on each side of the central slot.

10. The conveyor of claim 2 wherein said bottom wall is composed of a plurality of laterally spaced, side-by-side longitudinally extending strips.